(12) United States Patent
Sugino

(10) Patent No.: US 8,237,799 B2
(45) Date of Patent: Aug. 7, 2012

(54) IMAGING APPARATUS

(75) Inventor: Yoichi Sugino, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/633,130

(22) Filed: Dec. 8, 2009

(65) Prior Publication Data

US 2010/0149342 A1    Jun. 17, 2010

(30) Foreign Application Priority Data

Dec. 12, 2008   (JP) .................................. 2008-317515

(51) Int. Cl.
*H04N 5/225*   (2006.01)
(52) U.S. Cl. ........................................ 348/169; 382/103
(58) Field of Classification Search .................. 348/169; 382/103
See application file for complete search history.

(56) References Cited

U.S. PATENT DOCUMENTS

| 6,326,994 | B1 * | 12/2001 | Yoshimatsu | 348/169 |
| 7,613,321 | B2 * | 11/2009 | Altherr et al. | 382/103 |
| 2004/0150728 | A1 * | 8/2004 | Ogino | 348/239 |
| 2006/0013578 | A1 * | 1/2006 | Sato et al. | 396/100 |
| 2007/0115363 | A1 * | 5/2007 | Nakamura | 348/208.14 |
| 2009/0309983 | A1 * | 12/2009 | Ohara et al. | 348/208.4 |

FOREIGN PATENT DOCUMENTS

| JP | 61-034516 A | 2/1986 |
| JP | 08-009227 A | 1/1996 |

* cited by examiner

*Primary Examiner* — Philip B Tran
(74) *Attorney, Agent, or Firm* — Pearne & Gordon LLP

(57) ABSTRACT

An imaging apparatus has an imaging section that creates video data from an optical image of a subject field; a feature acquiring section that acquires features of a main subject in the subject field; a feature holding section that holds the acquired features; a tracking processing section that performs a predetermined process for tracking the main subject using the created video data and the held features; and a controlling section that validates or invalidates an operation of the feature acquiring section, and the controlling section invalidates the operation of the feature acquiring section when the imaging apparatus satisfies a predetermined condition.

8 Claims, 8 Drawing Sheets

IMAGING APPARATUS

CROSS REFERENCE TO RELATED APPLICATIONS

The disclosure of Japanese Patent Application No. 2008-317515, filed on Dec. 12, 2008, including the specification, drawings and abstract, is incorporated herein by reference in its entirety.

TECHNICAL FIELD

The technical field relates to an imaging apparatus. More particularly, the technical field relates to an imaging apparatus with a subject tracking function.

BACKGROUND ART

Conventionally, a technique of finding features of a subject specified by a camera user (hereinafter "user") or a subject specified by an imaging apparatus based on predetermined conditions, these subject being hereinafter referred to as "main subject," and estimating the area in image data where the main subject is present based on the features, is known. Particularly, the process of finding in a serial manner the area where the main subject is present in moving image data comprising image data that is inputted on a continuous basis, is carried out to follow the moving main subject, and therefore is often referred to as "tracking process" or "chasing process." Note that the process of following a main subject in moving image data will be referred to as "tracking" with the present invention.

Various types of imaging apparatuses that find the position of a main subject by such a tracking process and that perform shooting control for shooting the main subject adequately, including focus control for focusing on the main subject and framing control for adjusting the shooting range, are proposed (for example, see Patent Literature 1 and Patent Literature 2). Usually, in framing control, panning, tilting and zooming are performed such that the main subject is placed in the center of the screen.

FIG. 1A to FIG. 1D are schematic diagrams of the operation showing an overview of the operation in case where the imaging apparatus with an automatic tracking function disclosed in Patent Literature 1 decides that the sight of the main subject is lost.

In FIG. 1A, in field of view 10, main subject 20 is present, and specified extraction position 30 showing the reference position to extract main subject 20 is set. In FIG. 1B, when main subject 20 hides behind another object 40, main subject 20 is no longer detected. When main subject 20 is no longer detected, the imaging apparatus continues the operation of detecting main subject 20 by fixing specified extraction position 30. If main subject 20 reappears in specified extraction position 30, main subject 20 is successfully detected and therefore the imaging apparatus releases fixed specified extraction position 30.

However, as shown in FIG. 1C, when main subject 20 reappears in field of view 10, if main subject 20 has moved, main subject 20 is not successfully detected due to the deviation from specified extraction position 30.

Therefore, as shown in FIG. 1D, if the sight of main subject 20 is lost, specified extraction position 30 is changed in a serial manner around the position immediately before the sight of main subject 20 was lost, so that, when main subject 20 reappears in field of view 10, main subject 20 can be detected even if main subject 20 has moved to another position from the position the sight of main subject 20 was lost.

Various ranges of searching specified extraction position 30 when the sight of main subject 20 is lost are proposed, including, for example, the entire screen and the default position which is typically the center of the screen.

Further, Patent Literature 2 discloses a camera that has an operating means for bringing a tracking field view indicating the position of the main subject, back to the default position. When the sight of the main subject is lost, the operating means is operated to bring the tracking field view back to the default position. Here, the default position refers to, for example, the center of the screen. As the operation after bringing the tracking field view back to the default position, Patent Literature 2 presents a scheme of clearing features of the main subject to wait for another tracking start command from the user and a scheme of acquiring features of the main subject in the default position to start a tracking process without waiting for another tracking start command from the user.

CITATION LIST

Patent Literature

Patent Literature 1: Japanese Patent Application Laid-Open No. HEI8-009227
Patent Literature 2: Japanese Patent Application Laid-Open No. SHO61-34516

SUMMARY

Technical Problem

However, the tracking method disclosed in Patent Literature 1 continues the process of detecting a main subject while the sight of the main subject is lost, and therefore, there are possibilities that, when the sight of the main subject is decided to be lost or thereafter, a similar subject having features similar to the main subject or the background having features similar to the main subject is erroneously detected as the main subject. Further, when a similar subject comes in front of the main subject or when the main subject hides behind an obstacle in the background having an area of features similar to the main subject, there are possibilities that, while it is not decided that the sight of the main subject is lost, a similar subject or the background is detected as the main subject by error. Although various methods have been studied so far with image process technology for detecting the main subject, these methods are limited in terms of accuracy and are likely to cause such detection error.

Consequently, imaging apparatuses are preferably equipped with a mechanism for stopping the tracking process once according to commands from the user when the sight of the main subject is lost or when a possibility that a wrong subject is detected as the main subject is high, and resuming the tracking process when the user can see the reappearance of the main subject.

However, Patent Literature 1 does not explicitly disclose such a configuration, and, to avoid detection error, needs to stop the tracking process once, and then specify the main subject again and start the tracking process. This operation requires the user to specify the main subject accurately again even though the main subject itself has not changed, and may place heavy burdens on users. If the user specifies the main subject inaccurately, an object and background apart from the main subject are tracked and the user cannot shoot video images in a way as intended by the user.

Further, Patent Literature 2 discloses a method of stopping and resuming the tracking process according to commands from the user. However, with the method disclosed in Patent Literature 2, if the tracking field view is initialized according to commands from the user, features are cleared or features are updated based on the image in the default position of the tracking field view. Accordingly, features are newly acquired when the tracking process is resumed, and therefore the method disclosed in Patent Literature 2 requires the user to specify the main subject accurately again.

Further, in case where the main subject appears from, for example, behind an obstacle, the imaging apparatus disclosed in Patent Literature 1 and the camera disclosed in Patent Literature 2 need to specify the main subject when a figure of the main subject is completely seen. This is because, if the main subject is specified when only part of the main subject is seen, features are created including the background and obstacle and therefore an accurate tracking process is not possible. This restriction also places heavy burdens on users.

As described above, in order to avoid detection error, conventional techniques require users to specify a main subject accurately every time, for example, the tracking process is resumed, and this places heavy burdens on users.

An object is to provide an imaging apparatus that can alleviate burdens users take to specify a main subject.

Solution to Problem

To achieve the above object, an imaging apparatus has an imaging section that creates video data from an optical image of a subject field; a feature acquiring section that acquires features of a main subject in the subject field; a feature holding section that holds the acquired features; a tracking processing section that performs a predetermined process for tracking the main subject using the created video data and the features held; and a controlling section that validates or invalidates an operation of the feature acquiring section, and the controlling section invalidates the operation of the feature acquiring section when the imaging apparatus satisfies a predetermined condition.

Advantageous Effects

This apparatus can alleviate burdens users take to specify a main subject.

BRIEF DESCRIPTION OF DRAWINGS

FIG. 3A shows a display example in the display section when a main subject is specified and FIG. 3B shows a display example in the display section in the middle of a tracking process;

DESCRIPTION OF EMBODIMENTS

Embodiments of the present invention will be explained in detail below with reference to the accompanying drawings. Note that an example will be explained with each embodiment where a video camera is employed as an imaging apparatus.

Embodiment 1

Figure 1A:
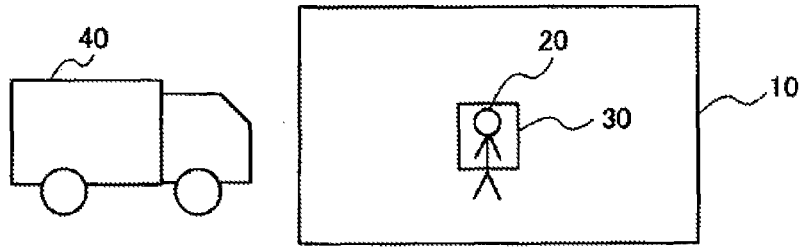
FIG. 1A to FIG. 1D are schematic diagrams of the operation showing an overview of the operation in case where an imaging apparatus having a conventional automatic tracking function decides that the sight of a main subject is lost.
Figure 1B:
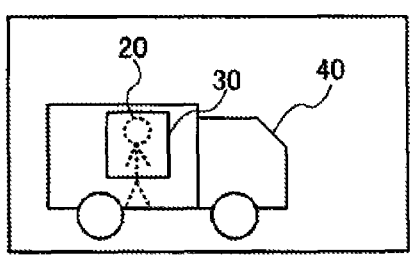
Figure 1C:
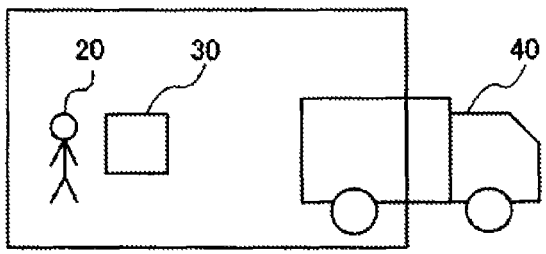
Figure 1D:
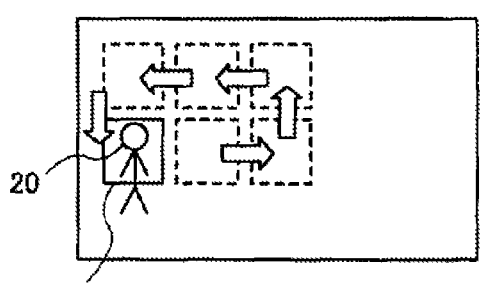
Figure 2:
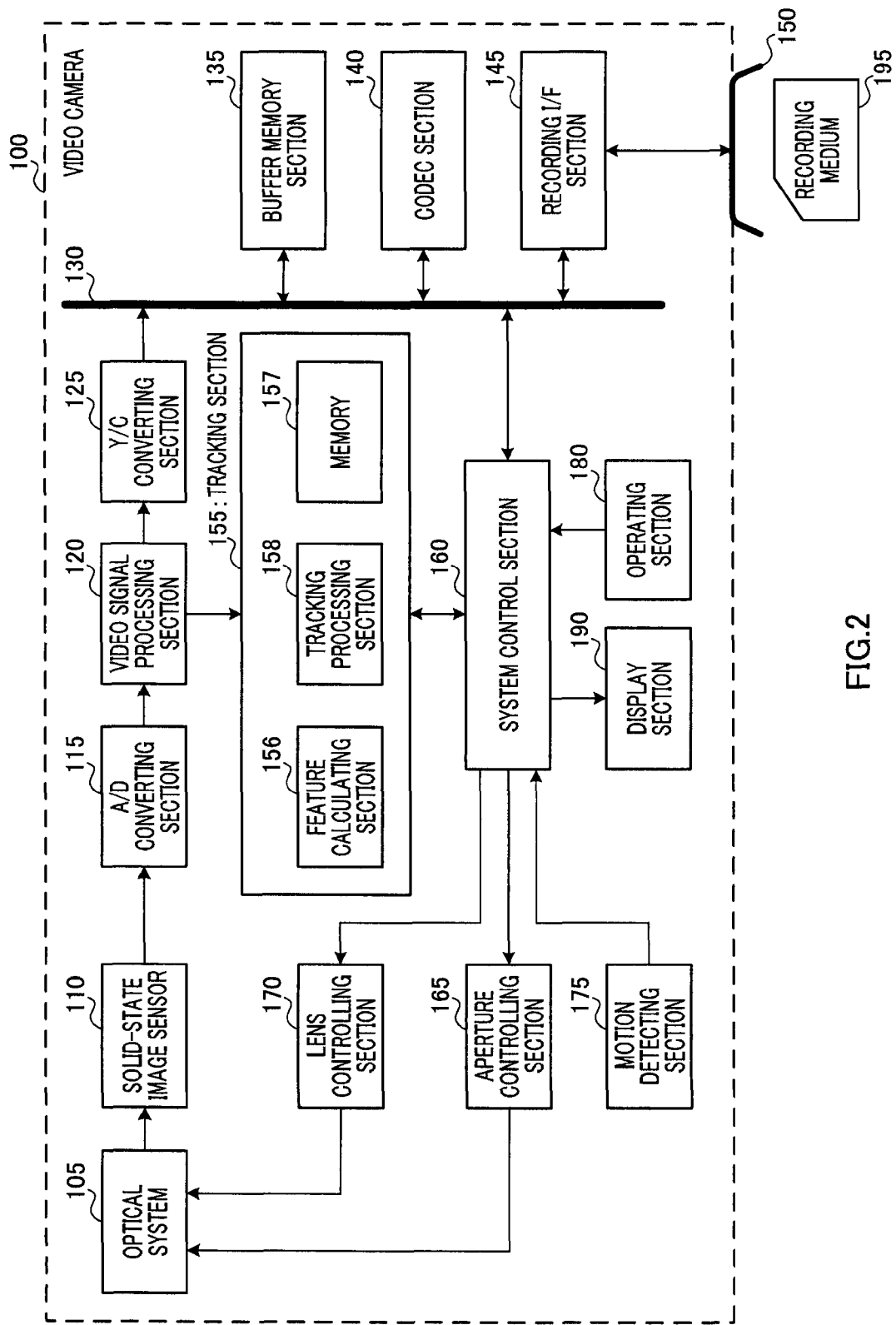
FIG. 2 is a block diagram showing the configuration of a video camera as an imaging apparatus according to Embodiment 1 of the present invention.

FIG. 2 is a block diagram showing the configuration of a video camera as an imaging apparatus according to Embodiment 1 of the present invention.

In FIG. 2, video camera 100 has optical system 105, solid-state image sensor 110, analogue-to-digital (A/D) converting section 115, video signal processing section 120, Y/C converting section 125, system bus 130, buffer memory section 135, codec section 140, recording interface (I/F) section 145, socket 150, tracking section 155, system control section 160, aperture controlling section 165, lens controlling section 170, motion detecting section 175, operating section 180 and display section 190.

Optical system 105 is formed with a plurality of lenses and an aperture section that performs exposure control (although not shown). The lenses forming optical system 105 include a focus lens which moves along the optical axis to adjust the focus adjustment state and a zoom lens which moves along the optical axis to vary the magnification of an optical image of a subject field including the subject. The optical image of a subject field is formed on solid-state image sensor 110 through optical system 105.

Solid-state image sensor 110 converts the optical image formed by imaging optical system 105 into an electrical signal (i.e. analogue video signal). For solid-state image sensor 110, for example, a CCD (Charge Coupled Device) image sensor or a CMOS (Complementary Metal Oxide Semiconductor) image sensor is used.

A/D converting section 115 converts an analogue video signal outputted from solid-state image sensor 110, into a digital video signal.

Video signal processing section 120 carries out common video signal processes such as gain adjustment, noise cancellation, gamma correction, aperture process and knee process for the digital video signal outputted from A/D converting section 115, and generates an RGB format digital video signal as video data. The generated video data is outputted to Y/C converting section 125 and tracking section 155.

That is, optical system 105, solid-state image sensor 110, A/D converting section 115 and video signal processing section 120 form an imaging section that receives as input an optical image of a subject field in solid-state image sensor 110 through optical system 105 to generate a digital video signal as video data from the received optical image.

Y/C converting section 125 converts the format of the digital video signal generated in video signal processing section 120 from the RGB format to the Y/C format. The digital video signal converted into the Y/C format in Y/C converting section 125 is outputted to buffer memory section 135 through system bus 130.

Buffer memory section 135 stores the digital video signal outputted from Y/C converting section 125 or codec section 140, as digital video information on a temporary basis.

Codec section 140 generates compressed video data of a predetermined format such as MPEG-2 (Moving Picture Experts Group phase 2) or H.264/MPEG-4 AVC (Moving Picture Experts Group phase 4 Part 10 Advanced Video Coding) by acquiring digital video information stored in buffer memory section 135 through system bus 130 and applying a lossy compression process to the acquired digital video information. Further, codec section 140 records the generated compressed video data in recording medium 195 electrically connected with socket 150 through system bus 130 and recording I/F section 145.

Furthermore, codec section 140 generates a digital video signal by acquiring the compressed video data recorded in recording medium 195 electrically connected with socket 150 and applying an extension process with respect to the acquired compressed video data. Codec section 140 outputs the generated digital video signal to buffer memory section 135 through system bus 130.

That is, codec section 140 and recording I/F section 145 form a recording section that has the function of recording the video data generated in the above imaging section, in recording medium 195 and the function of taking in video data recorded in recording medium 195, into video camera 100.

Further, although, with the present embodiment, recording medium 195 is a removable media that can be inserted in and removed from socket 150, recording medium 195 may be a hard disc built in video camera 100.

Tracking section 155 has feature calculating section 156 that is a feature acquiring section for implementing the function of tracking the subject and for acquiring features of the main subject in the subject field; memory 157 that is a feature holding section for holding the features acquired in feature calculating section 156; and tracking processing section 158 that performs a predetermined process for tracking the main subject using video data and features of the main subject.

Tracking section 155 generates image data on a continuous basis by adequately applying an image downsizing process to the RGB format digital video signal generated as video data in video signals processing section 120, and stores each generated image data in internal memory 157.

Particularly, feature calculating section 156 extracts various features from each image data stored in memory 157, and stores the extracted features in memory 157. Further, when tracking mode is validated, tracking processing section 158 executes a predetermined process (i.e. tracking process) for tracking the main subject in the subject field, based on the features stored in memory 157. The predetermined process (i.e. tracking process) may include various processes including, for example, changing the shooting area such that the main subject is included in the shooting area and optimizing the shooting conditions for the specific main subject (for example, AF and AE described later).

Here, extraction of features will be explained. Feature calculating section 156 can extract various features from image data according to a known method.

An example of extracted features includes the brightness level value in a specific area in image data specified by system control section 160. This brightness level value is used to perform exposure control. To be more specific, when feature calculating section 156 extracts the brightness level value in a specific area, system control section 160 calculates an optimal aperture value based on the extracted brightness level value, and reports the degree of aperture control to aperture controlling section 165 based on the calculated aperture value. Aperture controlling section 165 adjusts the aperture of optical system 105 by driving an aperture adjusting apparatus and shutter apparatus provided in optical system 105, based on the degree of aperture control reported from system control section 160.

Another example of the extracted features is high frequency component information in a specific area in image data specified by system control section 160. This high frequency component information is used to perform focus control. High frequency components included in a video signal is associated with the degree of focus adjustment, and takes the maximum value in a focus point. There, with the focus adjustment detection scheme generally known as the "hill-climbing method," the operation of detecting focus adjustment is performed by moving the focus lens and zoom lens forming optical system 105 and finding the maximum value for the high frequency components. That is, when feature calculating section 156 extracts high frequency component information in a specific area, system control section 160 determines the degree of lens control for controlling the focus lens and zoom lens forming optical system 105, based on the extracted high frequency component information, and reports the determined degree of lens control to lens controlling section 170. Lens controlling section 170 drives the focus lens and zoom lens forming optical system 105, based on the degree of lens control reported from system control section 160.

Feature calculating section 156 can extract an area (hereinafter "subject area") in image data where the possibility that the main subject is present is high, based on features of the main subject set in advance. Although such a process is generally referred to as "subject detection," there are cases where this process is referred to as "subject identification" or "subject recognition."

For example, feature calculating section 156 determines the subject area by using the pixel values of a pixel group as features and comparing between the areas of an input image on a per pixel basis. This method is generally referred to as "template matching."

Further, instead of pixel values, color histograms indicating the distribution of colors in the image area may be used as features. In this case, feature calculating section 156 selects an area group of subject area candidates from an input image, creates color histograms for the selected area group, calculates the similarity between the created color histograms using the histogram intersection method, and, as a result of calculation, determines the image area showing the highest matching rate as the subject area.

Here, an area group of subject area candidates are selected from, for example, a predetermined range of the area around the position of the previously extracted subject area. This is based on the assumption that the main subject does not move significantly in a short period of time, and it is possible to reduce the amount of processes and improve the accuracy of detection by neglecting similar subjects that are present in positions apart from the main subject.

Further, a profile may be used, or motion information using an inter-frame difference may be used for features.

Further, known Wavelet features such as Gabor and Haar-Like features may be used for features. Moreover, features acquired by prior learning using a sample image according to a detection target such as the face or body of a person, or a specific person or object may be used for features. In this case, based on the acquired features, feature calculating section 156 extracts the area as the subject area where the detection target is present, from an input image.

Various techniques related to the above-described subject detection are conventionally studied and developed. The present invention does not depend on specific features or subject detection methods, so that it is possible to use arbitrary features and subject detection methods, and it is also possible to use a plurality of techniques in combination.

Further, when receiving commands from system control section 160, feature calculating section 156 dynamically creates features that do not require prior learning using sample images such as color histograms and image templates. Dynamic creation of features will be described below.

Further, memory 157 is initialized when video camera 100 is powered off or when shooting mode is invalidated. All contents (such as features) held in memory 157 are cleared upon initialization.

Motion detecting section 175 detects the motion of video camera 100. Motion detecting section 175 is formed with, for example, an angular velocity sensor and A/D converter (although not shown). System control section 160 can detect the motion of video camera 100 in the yawing direction and pitching direction, based on the output of the angular velocity sensor of motion detecting section 175. Further, the configuration of motion detecting section 175 will be explained in more detail with Embodiment 2.

System control section 160 as a controlling section is formed with CPU (Central Processing Unit), ROM (Read Only Memory) that records a program and RAM (Random Access Memory) for executing the program (any one of these are not shown), and controls the operation of each section of video camera 100 through system bus 130.

To be more specific, when the user operates operating section 180, system control section 160 controls each section of video camera 100, particularly, the recording section formed with codec section 140 and recording I/F section 145, feature calculating section 156 (i.e. feature acquiring section) in tracking section 155, memory 157 (i.e. feature holding section) in tracking section 155 and tracking processing section 158 (i.e. tracking processing section) in tracking section 155, according to operation information received as input from operating section 180 based on the operation by the user.

Particularly, with the present embodiment, system control section 160 performs control to validate or invalidate the operation of feature calculating section 156. To be more specific, system control section 160 decides whether or not video camera 100 satisfies predetermined conditions, and invalidates the operation of feature calculating section 156 when video camera 100 is decided to satisfy the predetermined conditions. Here, the "predetermined conditions" mean that the possibility that video camera 100 captures the main subject accurately is low, and refers to cases where reutilizing the features that have already been acquired is more preferable than acquiring new features. Specific examples of cases where reutilizing features is more preferable are as follows.

For example, the first case is that tracking is stopped once (shooting is not finished) while video camera 100 performs shooting (i.e. recording) and resumes tracking afterward. This is because, if, during shooting, the user concentrates on specifying the main subject, a possibility that the image in the middle of shooting is blurred is high.

The second case is that the panning speed or tilting speed exceeds a threshold. In this case, video camera 100 is moved at high speed and the possibility that video camera 100 captures the main subject accurately is low.

A third case is that there is no area that is specified as the body or head of a person in a specified frame for specifying the main subject.

Further, the first case will be explained as an example with the present embodiment. The second case will be explained in Embodiment 2.

By invalidating the operation of feature calculating section 156, features that have already been acquired are utilized in the tracking process. That is, in specifying the main subject, system control section 160 dynamically decides whether to reutilize features that have already been acquired or acquire new features.

In this way, when the main subject is specified, system control section 160 decides whether or not to acquire features according to the state of video camera 100. Further, when the state of video camera 100 satisfies the predetermined conditions, system control section 160 reutilizes the previously acquired features to start the tracking process. A specific example of the state of video camera 100 includes cases where video camera 100 currently performs recording as described above. Further, cases where it is difficult to specify the main subject accurately because the screen is moving while video camera 100 is tilting or panning, may be set as the predetermined condition.

By this means, when the state of video camera 100 satisfies the predetermined conditions, previous features are reutilized to perform a tracking process, so that the user does not need to specify the main subject accurately and consequently it is possible to alleviate burdens of operating video camera 100.

Further, system control section 160 acquires digital video information stored in buffer memory section 135 through system bus 130, generates display data by applying an image downsizing process to the acquired digital video information, outputs the generated display data to display section 190, and has display data displayed on the display screen of display section 190 as a video image. Consequently, when shooting mode is selected, buffer memory section 135 stores video data generated in the above imaging section and therefore display section 190 displays a live video image. Further, when playback mode is selected, buffer memory section 135 stores video data generated in the above recording section and therefore display section 190 displays past recorded video images.

In generating display data, system control section 160 performs an image process of the display data generated such that various icons and so on that allow recording time information, battery level information and the functions during the operation to be intuitively understood are superimposed on a video image displayed on the display screen. Further, when operating section 180 is operated to request that a menu for various settings be displayed, system control section 160 performs an image process of display data such that the requested menu is displayed on the display screen. Furthermore, when a menu is selected and the operations of setting and setting reset are performed, system control section 160 performs an image process of display data according to these operations.

Display section 190 has a thin display panel such as a small LCD (Liquid Crystal Display) panel and an electric view finder ("EVF").

Operating section 180 is formed with a plurality of operating members. The user can operate operating section 180 looking at video images displayed on the small, thin display panel or EVF. When operating section 180 is operated, system control section 160 receives operation information as input from operating section 180.

The operating members are typically buttons and levers. When the operating members are buttons, the user performs the operation of pressing an operating member to change the released state (i.e. OFF state) of the button to the pressed state (i.e. ON state), and return the pressed state (i.e. ON state) of the button to the released state (i.e. OFF state).

Further, the operating members may include, for example, capacitive sensors that can detect that part of the body of a person touches the operating member. In case where operating section 180 has such a sensor, system control section 160 decides that the operating member is in the pressed state (i.e. ON state) when it is detected that part of the body of a person touches the operating member, and decides that the operating member is in the released state (i.e. OFF state) when part of the body of a person is not decided to touch the operating member.

Although not shown, operating section 180 has, for example, a recording button and tracking button as operating members.

The recording button is a button for commanding start and stop of recording. The recording button is a button that is in the pressed state while pressed, and is in the released state while unpressed. Every time the recording button is pressed by a finger and the released state of the button changes to the pressed state, system control section 160 performs recording start control and recording stop control alternately, and, by this means, recording starts when the recording button is pressed once and stops when the recording button is pressed one more time. That is, while the released state of the recording button changes to the pressed state by one pressing operation and the pressed state of the button is returned to the released state, system control section 160 controls the recording section (i.e. codec section 140 and recording I/F section 145 of FIG. 2) to either start recording or stop recording.

The tracking button is a button for commanding start and stop of tracking. The tracking button is a button that is in the pressed state while pressed and that is in the released state while unpressed. According to the control executed by system control section 160, tracking is started when the tracking button is pressed by a finger and the released state of the button changes to the pressed state, is continued while the tracking button is pressed by a finger, is stopped when the finger is detached from the tracking button and is not performed while the finger is detached from the tracking button. That is, while the released state of the tracking button changes to the pressed state by one pressing operation and the pressed state of the button is returned to the released state, system control section 160 controls the tracking section (tracking section 155 of FIG. 2) to start and stop tracking.

Next, the method of specifying the main subject according to the present embodiment will be explained.

Figure 3A:
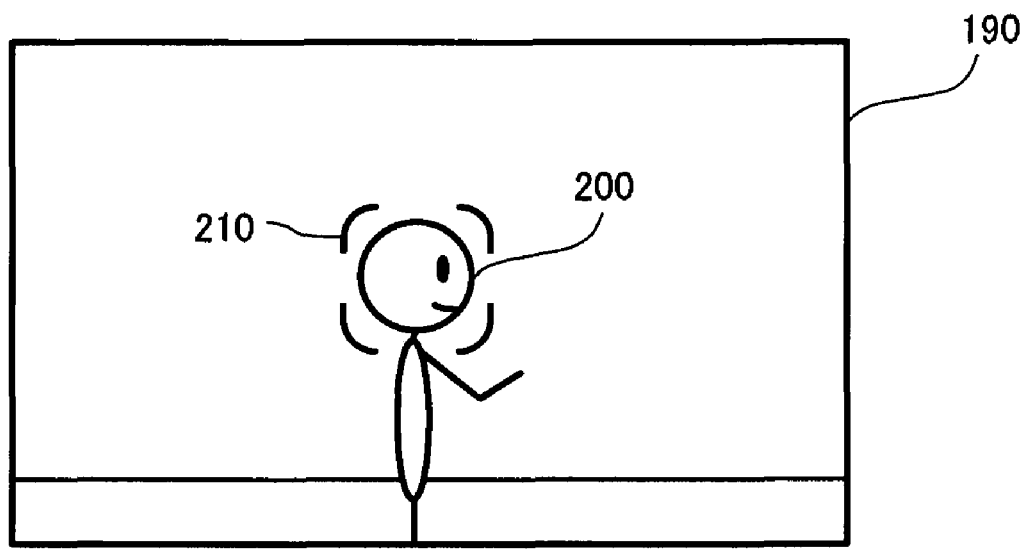
FIG. 3A and FIG. 3B show examples of display content in a display section according to the present embodiment, and, particularly.
Figure 3B:
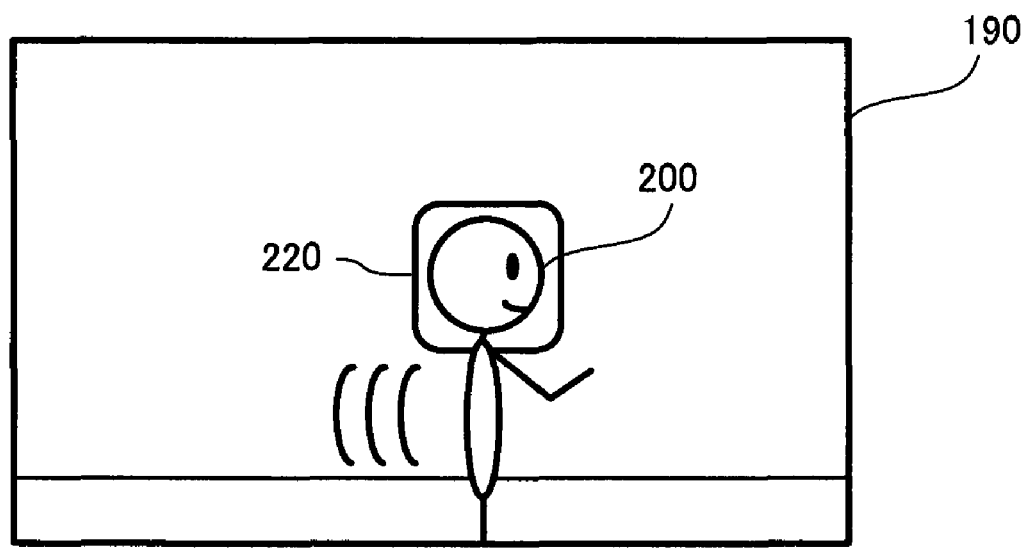

FIG. 3A and FIG. 3B show examples of display content in display section 190 according to the present embodiment. In FIG. 3A, specifying frame 210 is a frame display for specifying main subject 200, and is displayed in the center of the screen when tracking mode is validated. When the tracking button forming operating section 180 is pressed in a state main subject 200 is captured in specifying frame 210, feature calculating section 156 in tracking section 155 generates features used in a tracking process, based on image data matching the area in specifying frame 210.

When the tracking process is started, tracking frame 220 is superimposed on main subject 200 and is displayed as shown in FIG. 3B.

Next, the flow of the process in video camera 100 in case where a result of tracking the main subject is used in automatic exposure control and automatic focus control, will be explained using the flowchart shown in FIG. 4.

Figure 4:
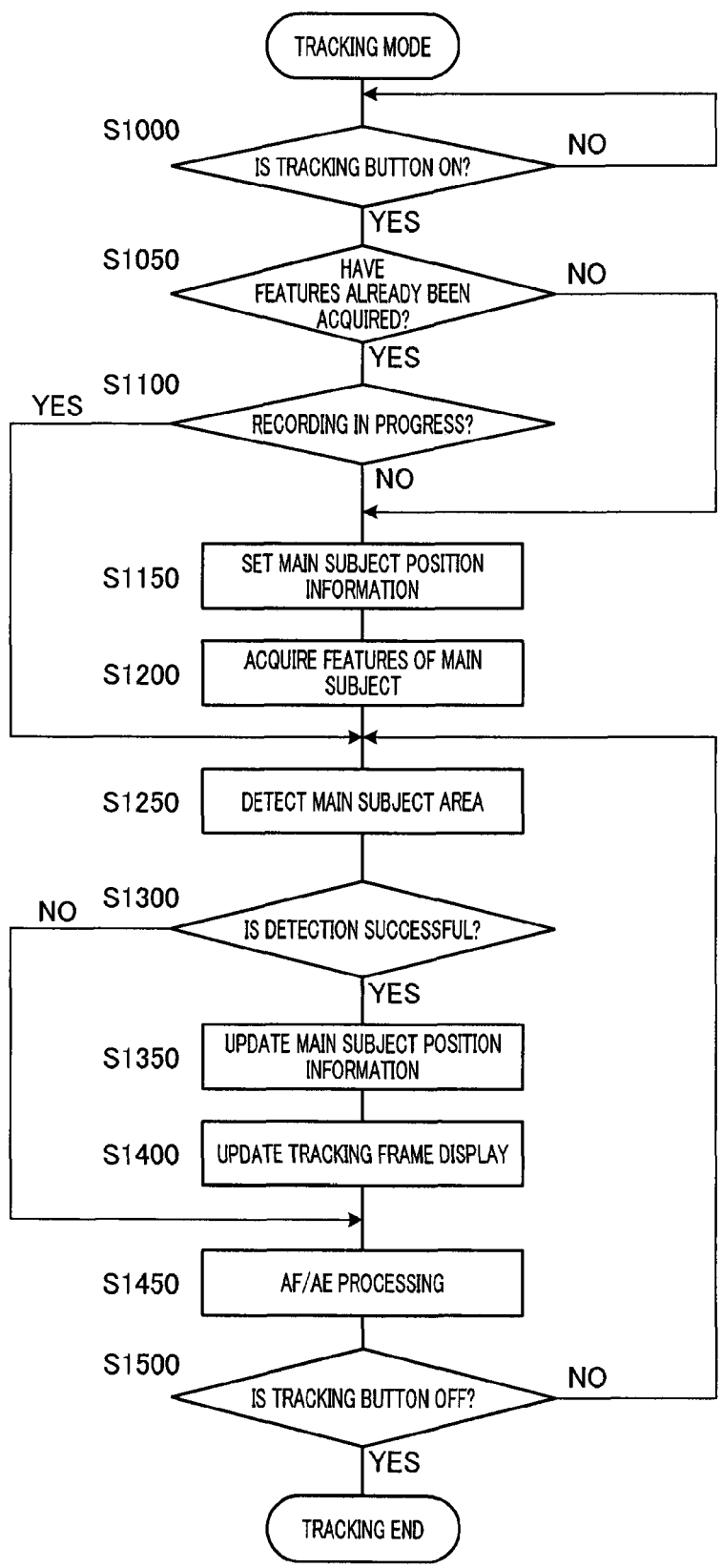
FIG. 4 is a flowchart showing steps of a tracking process according to the present embodiment.

In the flowchart of FIG. 4, the user operates in advance a mode dial, which forms operating section 180, to switch mode of video camera 100 to shooting mode and validate the tracking function.

In this state, first, in step S1000, system control section 160 decides whether or not the tracking button forming operating section 180 is in the pressed state (i.e. ON state). As a result of this decision, if the tracking button is in the pressed state (i.e. ON state) (S1000: YES), the step proceeds to step S1050, and, if the tracking button is not in the pressed state (i.e. ON state) (S1000: NO), system control section 160 stands by until the tracking button is placed in the pressed state (i.e. ON state).

Then, in step S1050, system control section 160 decides whether or not features have already been acquired, that is, whether or not features are held in memory 157. As a result of this decision, if features have already been acquired (S1050: YES), the step proceeds to step S1100, and, if features have not been acquired (S1050: NO), the step proceeds immediately to step S1150. For example, when first tracking is commanded after video camera 100 is powered on or when first tracking is commanded after shooting mode is selected, features are not decided to have been acquired and the step proceeds immediately to step S1150 regardless of whether or not recording is in progress, to make the default setting of the tracking process (that is, to set up information about the position of the main subject and acquire features of the main subject). This is because features that are reutilized are not held in memory 157 in tracking section 155.

In step S1100, system control section 160 decides whether or not video camera 100 is currently recording. This decision is made by checking that the recording button forming operating section 180 is in the pressed state (i.e. ON state) and checking whether or not the recording section (i.e. codec section 140 and recording I/F section 145 of FIG. 2) is performing a recording process. As a result of this decision, if video camera 100 is currently recording (S1100: YES), the step proceeds immediately to step S1250, and, if video camera 100 is not currently recording (S1100: NO), the step proceeds to step S1150.

In step S1150, system control section 160 sets a coordinate of specifying frame 210 as main subject position information, in a memory (i.e. RAM not shown).

Then, in step S1200, feature calculating section 156 in tracking section 155 acquires features of a partial image in the position indicated by the main subject position information set in step S1150 according to the method that has already been described. The acquired features are held in memory 157.

That is, in step S1150 and step S1200, information required to start a tracking process is set as the default setting of a tracking process. In subsequent steps, based on the acquired information, the tracking process is executed. Further, if video camera 100 is currently recording (S1100: YES), processes in step S1150 and step S1200 are skipped, and therefore the features used in the previous tracking process and the main subject position information at the time the previous tracking process ended are reutilized in subsequent steps.

In step S1250, tracking section 155 detects the subject area. To be more specific, tracking section 155 extracts subject candidate areas from image data, based on the main subject position information according to the method that has already been described above, and selects the subject area that optimally matches features currently held in memory 157, from the subject candidate areas, as the subject area.

Then, in step S1300, system control section 160 decides whether or not a result of the subject area detection in step S1250 indicates success. As a result of this decision, if the result of the subject area detection indicates success (S1300: YES), the step proceeds to step S1350, and, if the result of the subject area detection does not indicate success (S1300: NO), the step proceeds immediately to step S1450.

In step S1350, system control section 160 updates main subject position information.

Then, in step S1400, system control section 160 updates a display for tracking frame 220 based on the main subject position information updated in step S1350.

In step S1450, system control section 160 performs automatic exposure ("AE") control and automatic focus ("AF") control based on the current main subject position information according to the method that has already been described.

Further, with the present embodiment, if the result of the subject area detection does not indicate success (S1300: NO), that is, if the main subject is not detected successfully, step S1300 transitions immediately to step S1450 and therefore automatic exposure control and automatic focus control are performed based on the previous main subject position information. Note that there are various processes in case where the detection of the main subject fails and the operation according to the present embodiment is just one example of those processes.

Then, in step S1500, system control section 160 decides whether or not the tracking button forming operating section 180 is in the released state (i.e. OFF state). As a result of this decision, if the tracking button is in the released state (i.e. OFF state) (S1500: YES), the tracking process is finished, and, if the tracking button is not in the released state (i.e. OFF state) (S1500: NO), the step returns to step S1250 to continue the tracking process.

Further, assume that, while the tracking process based on the flowchart shown in FIG. 4 is performed, tracking section 155 receives as input digital video signals in a serial manner from video signal processing section 120 and updates image data in memory 157 in tracking section 155 in a serial manner, based on the input digital video signals.

Figure 5:
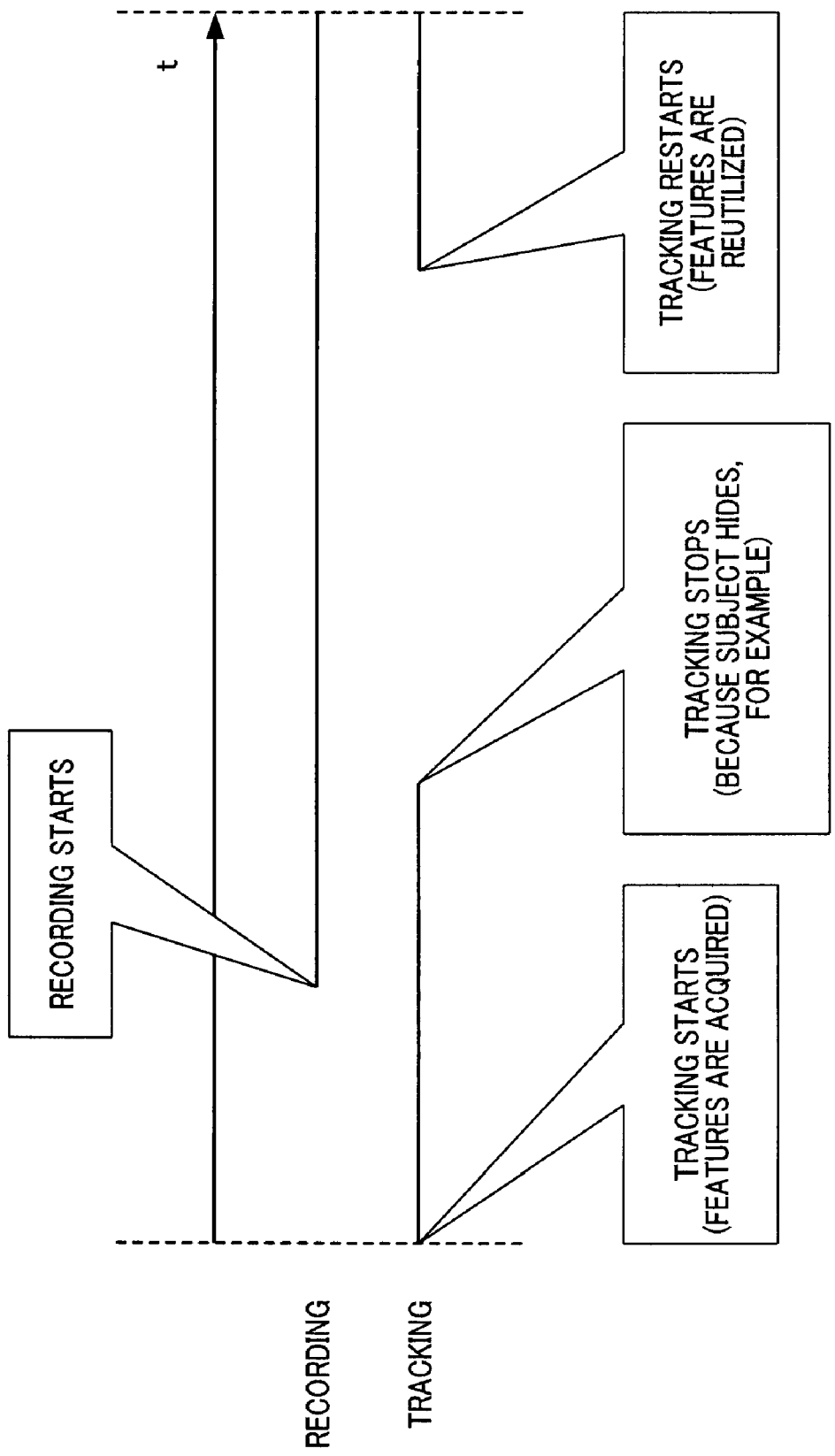
FIG. 5 illustrates an example of a tracking process based on the flowchart shown in FIG. 4.

FIG. 5 illustrates an example of a tracking process based on the flowchart shown in FIG. 4.

As shown in FIG. 5, in case where features of the main subject are acquired at the time of start of tracking such as the time of the first tracking command after video camera 100 is powered on or the time of the first tracking command after shooting mode is selected and then recording starts, if the user stops tracking once because the main subject hides behind another object during recording and resumes tracking, features used when tracking has stopped are reutilized. That is, according to the process shown in FIG. 4, when a command to start tracking is received during recording, features used in the previous tracking process are reutilized.

In this way, according to the present embodiment, when whether or not video camera 100 is currently recording is decided to resume tracking, if video camera 100 is decided to be currently recording, the previously acquired features are reutilized to start a tracking process, so that the user does not need to specify the main subject accurately, and, consequently, it is possible to alleviate burdens the user takes to specify the main subject.

Embodiment 2

A case will be explained with Embodiment 2 where whether or not an imaging apparatus (i.e. video camera) is virtually still, provides a criterion for deciding whether or not to reutilize features of a main subject.

The video camera as an imaging apparatus according to the present embodiment has the same, basic configuration as corresponding video camera 100 of Embodiment 1 shown in FIG. 2, and the same components will be explained using the same reference numerals.

Characteristics of the present embodiment include that, in case where the user is decided to be panning or tilting video camera 100, features of the main subject are reutilized in specifying the main subject. This is because the user concentrates on the framing of video camera 100 and therefore it is difficult to specify the subject accurately compared to the case where the user is not panning or tilting video camera 100.

The motion of video camera 100 is detected in motion detecting section 175. Motion detecting section 175 is formed with, for example, an angular velocity sensor and A/D converter. Two pairs of these components (i.e. angular velocity sensors and A/D converters) are provided for motion detection in the yawing direction and for motion detection in the pitching direction.

The angular velocity sensors of motion detecting section 175 output two angular velocity signals of the yawing direction and the pitching direction. The two angular velocity signals outputted from the angular velocity sensors are each A/D converted in the A/D converters of motion detecting section 175, and are reported to system control section 160. System control section 160 applies highpass filtering to the two angular velocity signals to cut off low frequency components, and then integrates the angular velocity signals to acquire angular displacement signals. When an angular velocity or angular displacement signal in the yawing direction is equal to or more than a predetermined value (i.e. first threshold), system control section 160 decides that video camera 100 is currently panning. Similarly, when the angular velocity or angular displacement signal in the pitching direction is equal to or more than a predetermined value (i.e. second threshold), system control section 160 decides that video camera 100 is currently tilting.

Figure 6:
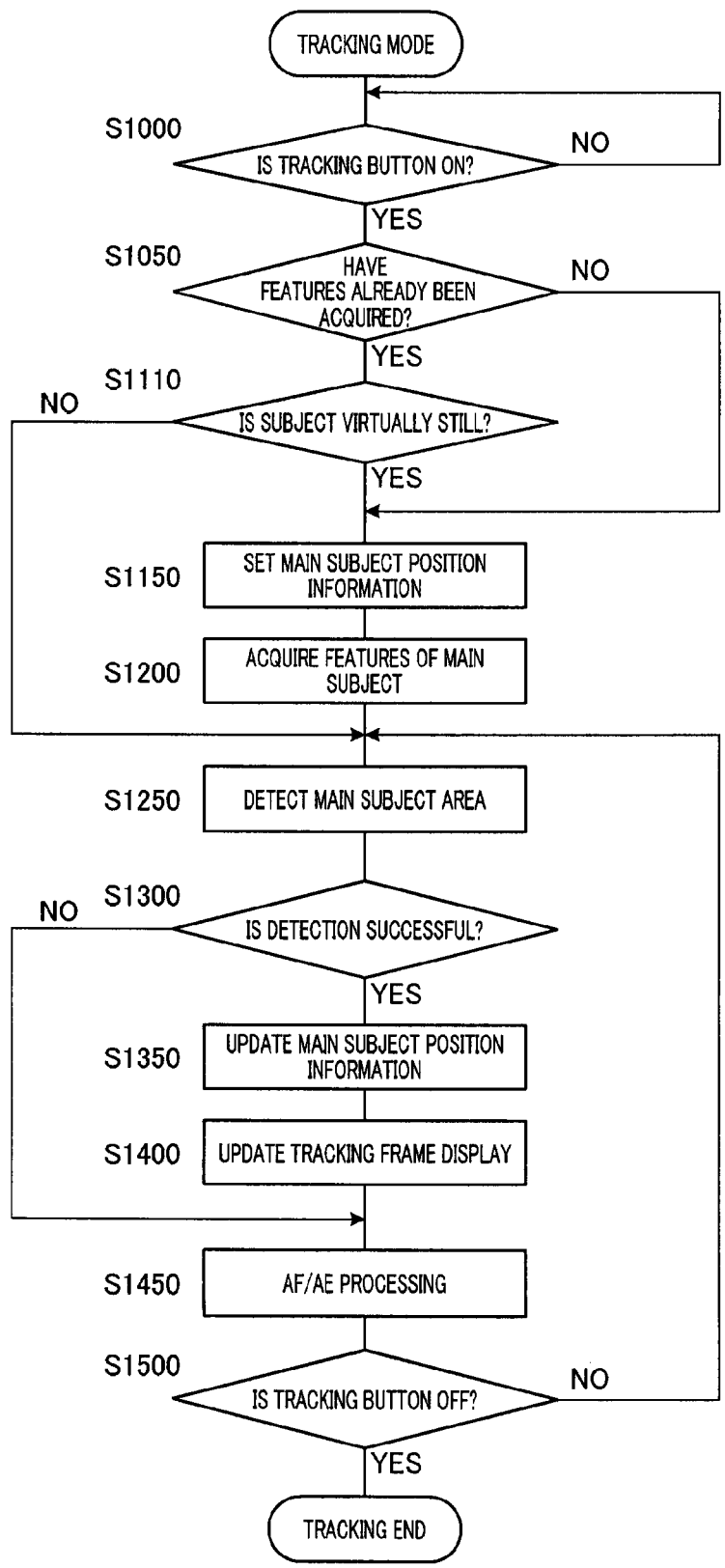
FIG. 6 is a flowchart showing steps of a tracking process according to Embodiment 2 of the present invention.

FIG. 6 is a flowchart showing the step of a tracking process in the present embodiment.

With the present embodiment, as shown in FIG. 6, step S1110 is inserted in the flowchart shown in FIG. 4 and step S1100 is removed.

Step S1000 and step S1050 are the same steps as each step in the flowchart shown in FIG. 4, and therefore explanation thereof will be omitted.

In step S1110, system control section 160 decides whether or not video camera 160 is virtually still. As described above, this decision is made by comparing the output of motion detecting section 175 with a threshold. As a result of this decision, if video camera 100 is virtually still (S1110: YES), the step proceeds to step S1150, and, if video camera 100 is not virtually still (S1100: NO), the step proceeds immediately to step S1250.

Step S1150 to step S1500 are the same as in each step of the flowchart shown in FIG. 4, and therefore explanation thereof will be omitted.

In this way, with the present embodiment, when whether or not video camera 100 is virtually still is decided to resume tracking, if video camera 100 is not decided to be virtually still, the previously acquired features are reutilized to start a tracking process, so that the user does not need to specify the main subject accurately and, consequently, it is possible to alleviate burdens the user takes to specify the main subject.

Embodiment 3

Embodiment 3 relates to display content in display section 190 in Embodiment 1 and Embodiment 2, and a case will be explained with Embodiment 3 where whether or not features of the main subject are in a state to be reutilized is presented to the user comprehensively.

The video camera as an imaging apparatus according to the present embodiment has the same, basic configuration as corresponding video camera 100 of Embodiment 1 shown in FIG. 2, and the same components will be explained using the same reference numerals.

FIG. 7A to FIG. 7D show examples of a display in display section 190 according to the present embodiment in case where a tracking process is stopped in a situation where features are decided to be reutilized. With the present embodiment, display section 190 functions as the reporting section that reports whether or not video camera 100 satisfies the predetermined conditions (that is, video camera 100 is currently recording, panning or tilting).

Figure 7A:
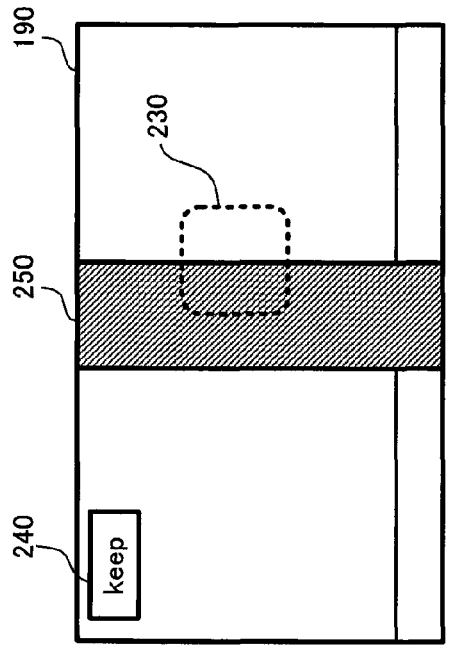
FIG. 7A to FIG. 7D show display examples in a display section when a tracking process is stopped in a situation in which reutilization of features is decided, according to Embodiment 3 of the present invention.

In FIG. 7A, a display of tracking frame 230, which is a mark to indicate the position of main subject 200, is changed from a solid line to a broken line (see FIG. 3B), such that reutilization of features is reported to the user in case where the next tracking process is performed. Further, the display style of tracking frame 230 is one example and display style of changing foreground colors is possible. Further, display section 190 displays icon 240 supplementarily in addition to the change (from a solid line to a broken line) of the display content in tracking frame 230.

Figure 7B:
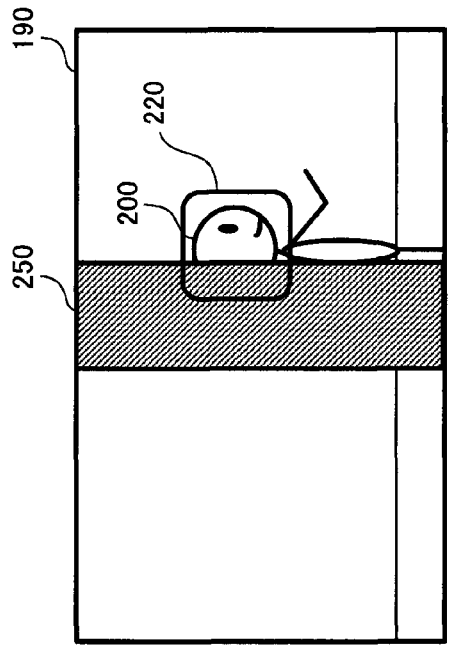

FIG. 7A shows that main subject 200 is about to hide behind obstacle 250. After this, as shown in FIG. 7B, when main subject 200 reappears from obstacle 250, if the user presses the tracking button, features are reutilized and a tracking process is started. Based on the main subject position information at the time shown in FIG. 7A, the main subject is searched for in its surrounding, so that, as shown in FIG. 7B, it is possible to capture main subject 200 that has appeared from obstacle 250.

Figure 7C:
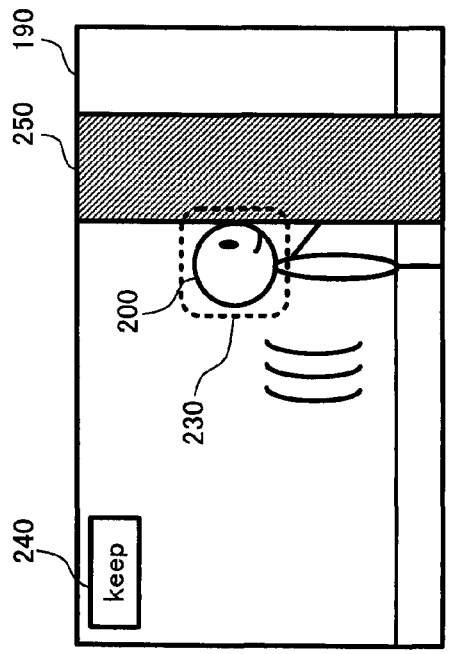
Figure 7D:
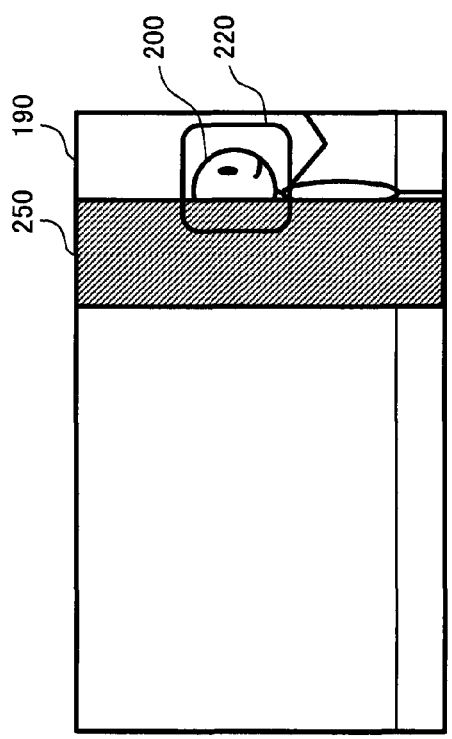

The range in which detection of main subject 200 is tried is limited and, consequently, by moving video camera 100 once to adjust tracking frame 230 to a position where main subject 200 is likely to appear the next time as shown in FIG. 7C and FIG. 7D, it is possible to capture main subject 200 more reliably. In FIG. 7B and FIG. 7D, if features of main subject 200 are not reutilized, features are acquired including obstacle 250 and therefore the possibility that performance deteriorates in the subsequent tracking process and error detection occurs becomes higher. However, with the scheme according to the present invention, such performance deterioration does not occur.

In this way, according to the present embodiment, display section 190 reports whether or not video camera 100 satisfies the predetermined conditions (that is, video camera 100 is currently recording, panning or tilting), so that it is possible to report to the user that features are reutilized in case where a tracking process is performed the next time.

Preferable embodiments of the present invention have been explained above.

Further, the present invention is not limited to the above embodiments, and it naturally follows that the present invention can be variously modified within the scope that does not deviate from the spirit of the present invention. Particularly, the condition to decide whether to reutilize features is not limited to above-described Embodiment 1 and Embodiment 2, and various conditions are possible according to the functions provided in imaging apparatuses, such as the condition of deciding whether or not to perform shooting manually when manual shooting that invalidates automatic focus control is possible. Further, a plurality of conditions may be combined by, for example, combining the condition of Embodiment 1 that video camera 100 is currently recording and the condition of Embodiment 2 that video camera 100 is currently panning or tilting.

Furthermore, with the above embodiments, although tracking results are applied to exposure control and focus control, the present invention is not limited to this. There is no problem even if tracking results are used in other shooting functions by, for example, using tracking results in automatic framing control for placing the main subject in the center of the screen as soon as possible by means of optical control or electrical control.

Further, the display content described in Embodiment 3 is only an example, and, for example, the reutilization of features of the main subject may be displayed by means of a message.

Figure 8:
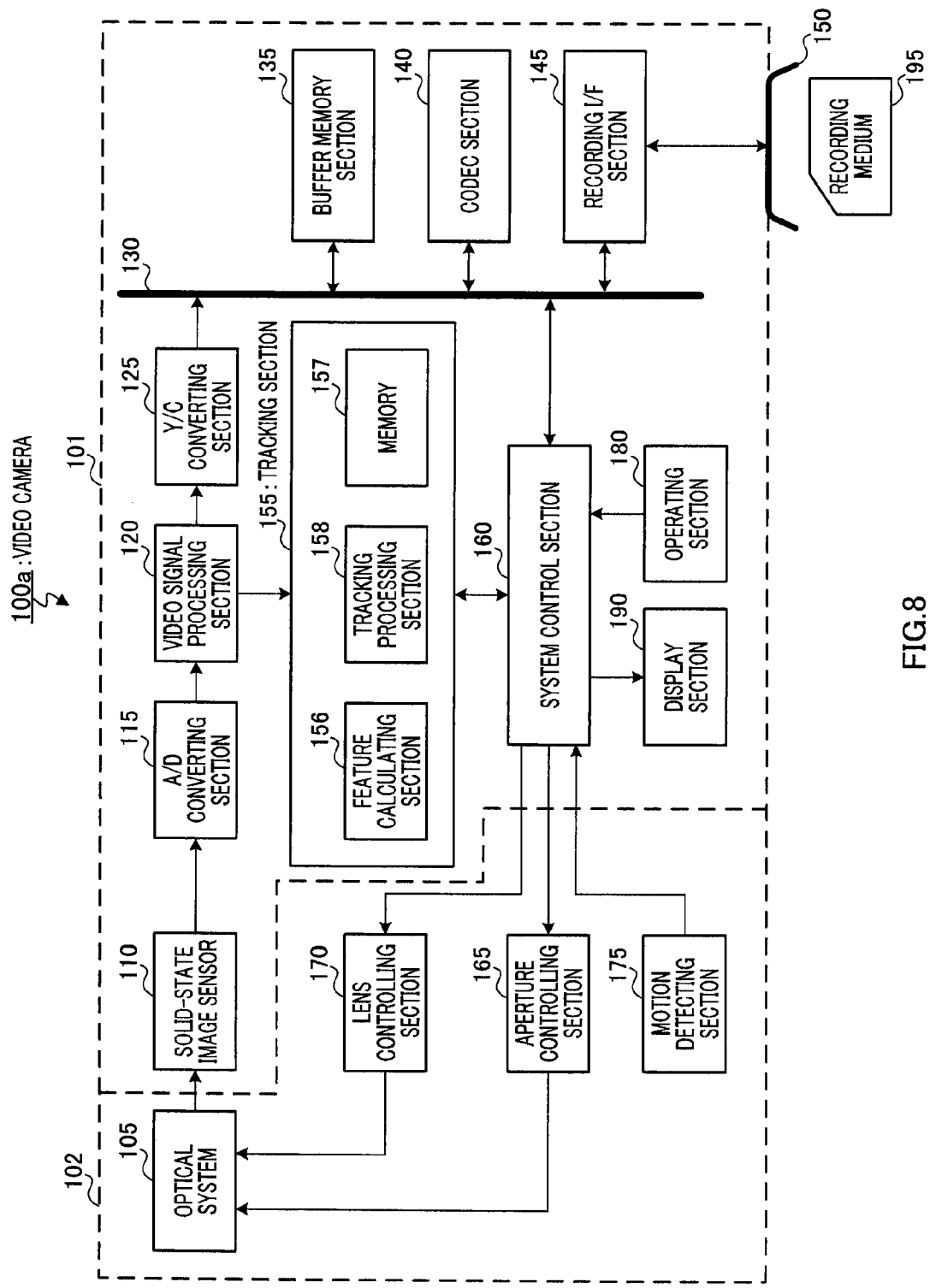
FIG. 8 is a block diagram showing one modified example of a configuration of the video camera shown in FIG. 2.

Furthermore, as one modified example of the configuration shown in FIG. 2, the above embodiments are applicable to imaging apparatus with replacable lens 100a (here, video camera) shown in FIG. 8. Video camera with replacable lens 100a is formed with camera body 101 and lens unit 102 that are separable. As shown in FIG. 8, camera body 101 has solid-state image sensor 110, A/D converting section 115, video signal processing section 120, Y/C converting section 125, system bus 130, buffer memory section 135, codec section 140, recording I/F section 145, socket 150, tracking section 155, system control section 160, operating section 180 and display section 190, and lens unit 102 has optical system 105, aperture controlling section 165, lens controlling section 170 and motion detecting section 175.

Further, although the above embodiments have been explained where a video camera is employed as an imaging apparatus, it is obvious that the present invention is also applicable in the same way to other imaging apparatuses such as digital cameras with tracking functions.

INDUSTRIAL APPLICABILITY

This apparatus is useful as an imaging apparatus that can alleviate burdens users take to specify a main subject.

That is, according to this method of specifying a subject, when it is decided that the user has difficulty in specifying the main subject accurately, for example, when an imaging apparatus is currently recording or is moving, features of the main subject are reutilized, so that it is possible to alleviate burdens the user takes to specify the main subject. The resulting effect improves the operability of the function of tracking the subject, and is useful for imaging apparatuses that can shoot various moving images, such as digital cameras and digital video cameras having tracking functions.

REFERENCE SIGNS LIST 100, 100a VIDEO CAMERA
101 CAMERA BODY
102 LENS UNIT
105 OPTICAL SYSTEM
110 SOLID-STATE IMAGE SENSOR
115 A/D CONVERTING SECTION
120 VIDEO SIGNAL PROCESSING SECTION
125 Y/C CONVERTING SECTION
130 SYSTEM BUS
135 BUFFER MEMORY SECTION
140 CODEC SECTION
145 RECORDING I/F SECTION
150 SOCKET
155 TRACKING SECTION
156 FEATURE CALCULATING SECTION

157 MEMORY
158 TRACKING PROCESSING SECTION
160 SYSTEM CONTROL SECTION
165 APERTURE CONTROLLING SECTION
170 LENS CONTROLLING SECTION
180 OPERATING SECTION
190 DISPLAY SECTION
195 RECORDING MEDIUM

The invention claimed is:

1. An imaging apparatus comprising:
an imaging section that creates video data from an optical image of a subject field;
a feature acquiring section that acquires a feature of a main subject in the subject field;
a tracking button that commands start and stop of tracking;
a reference feature holding section that holds, as a reference feature, the feature acquired by the feature acquiring section when the tracking button commands the start of the tracking;
a tracking processing section that performs a predetermined process for tracking the main subject using the video data created by the imaging section, the feature acquired by the feature acquiring section and the reference features held by the reference feature holding section; and
a controlling section that validates or invalidates an operation of the reference feature holding section,
wherein, when the tracking button commands the start and when the imaging apparatus satisfies a predetermined condition, the controlling section invalidates the operation of the reference feature holding section so that the reference feature holding section does not hold the feature acquired by the feature acquiring section as the reference feature.

2. The imaging apparatus according to claim 1, further comprising a recording section that records the video data created by the imaging section,
wherein the predetermined condition is a state the video data created by the imaging section is being recorded by the recording section.

3. The imaging apparatus according to claim 1, further comprising a motion detecting section that detects a motion of the imaging apparatus,
wherein the predetermined condition is a state a predetermined motion of the imaging apparatus is detected by the motion detecting section.

4. The imaging apparatus according to claim 3, wherein the predetermined motion includes one of panning and tilting of the imaging apparatus.

5. The imaging apparatus according to claim 1, wherein, when an operation of the tracking processing section is started, if a reusable reference feature is not held by the reference feature holding section, the controlling section validates the operation of the reference feature holding section regardless of whether or not the imaging apparatus satisfies the predetermined condition.

6. The imaging apparatus according to claim 1, further comprising a reporting section that reports whether or not the imaging apparatus satisfies the predetermined condition.

7. The imaging apparatus according to claim 6, further comprising a display section that displays the video data created by the imaging section, wherein:
the display section superimposes a mark indicating a position of the main subject, upon the video data and displays the mark; and
the reporting section changes display content of the mark when the imaging apparatus satisfies the predetermined condition.

8. The imaging apparatus according to claim 6, further comprising a display section that displays the video data created by the imaging section,
wherein the reporting section displays a predetermined icon on the display section when the imaging apparatus satisfies the predetermined condition.

* * * * *